B. E. TAYLOR.
CLEANSING MACHINE OR APPARATUS.
APPLICATION FILED APR. 4, 1918.
1,309,785.
Patented July 15, 1919.
11 SHEETS—SHEET 1.
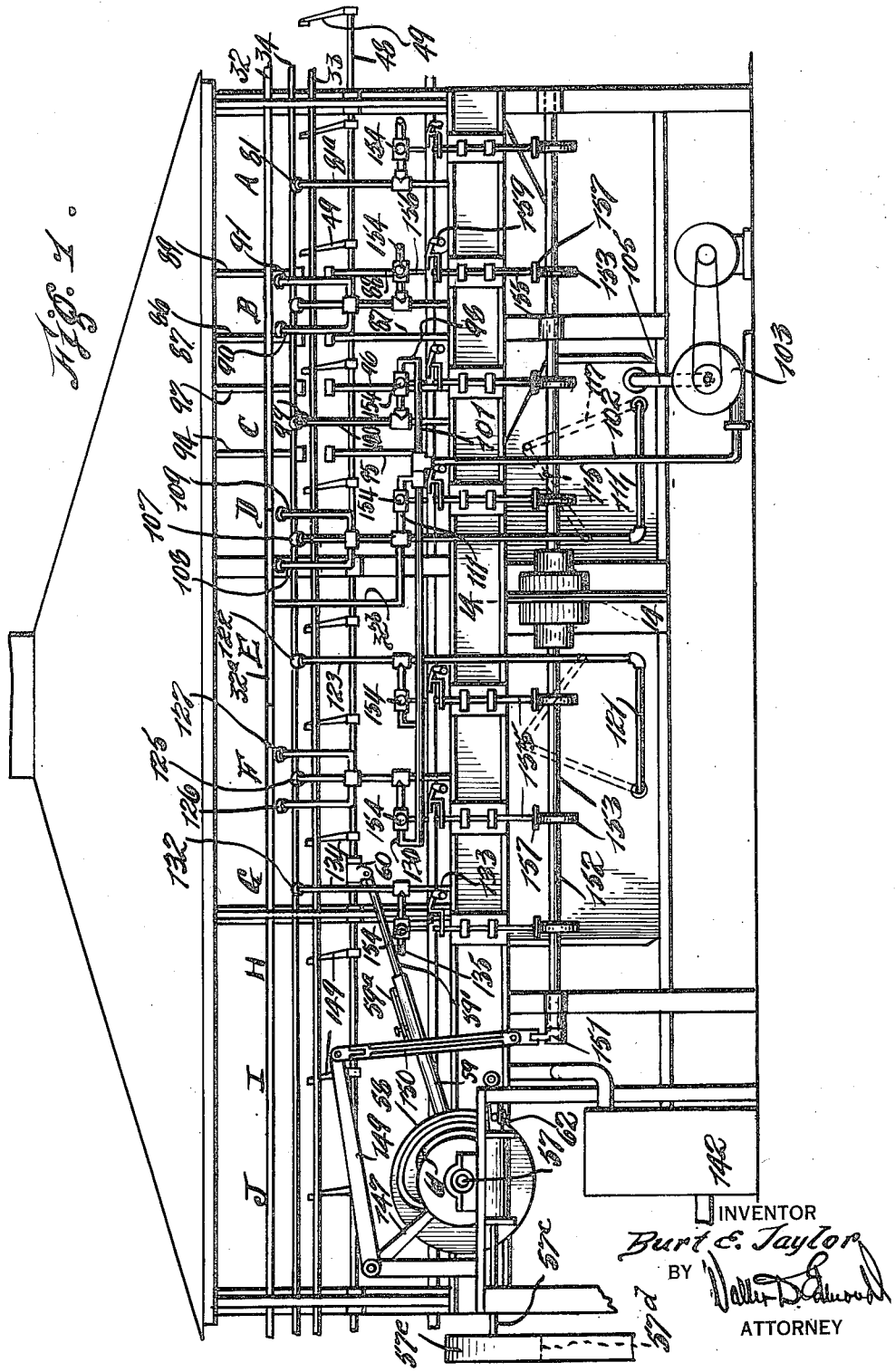

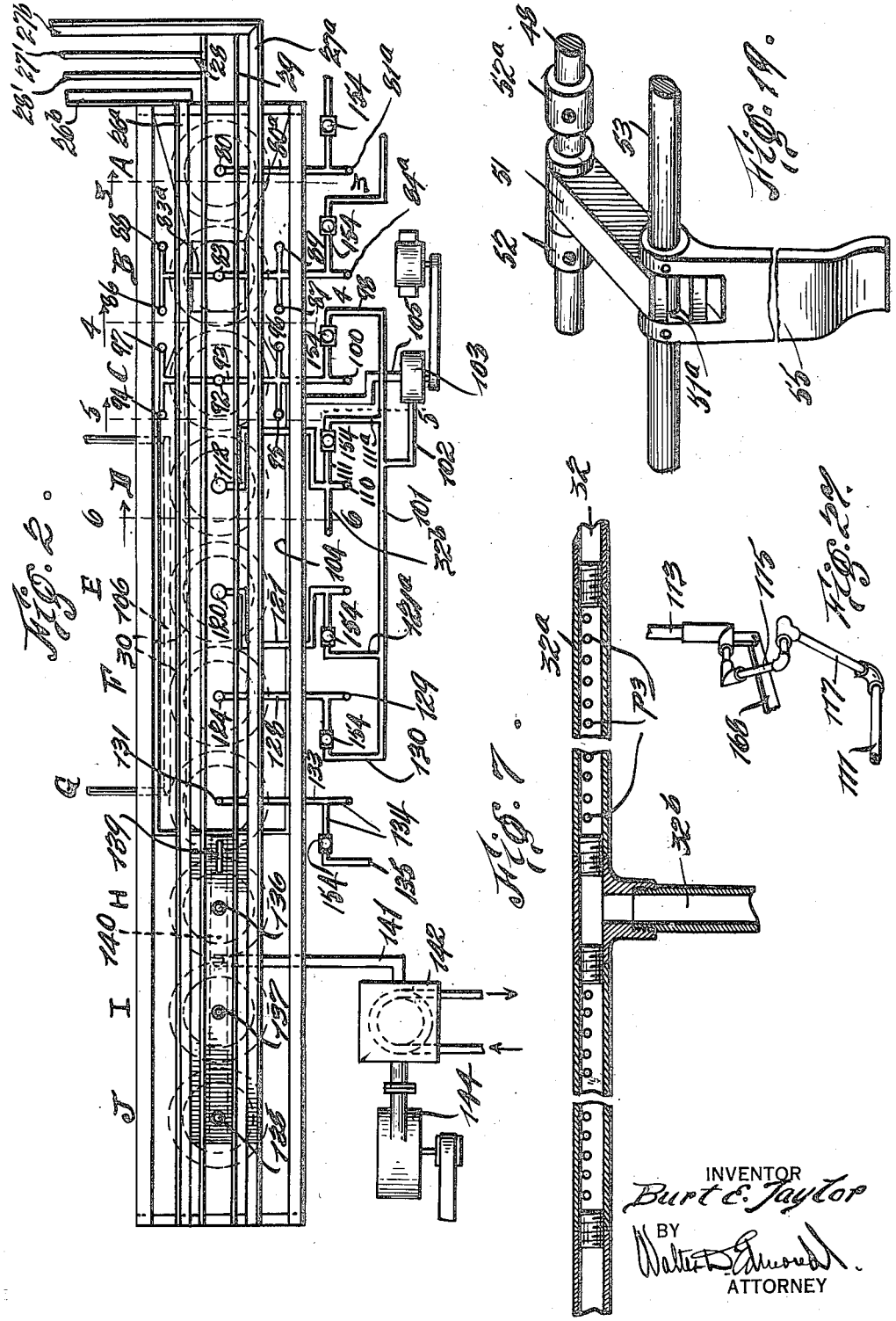

B. E. TAYLOR.
CLEANSING MACHINE OR APPARATUS.
APPLICATION FILED APR. 4, 1918.
1,309,785.
Patented July 15, 1919.
11 SHEETS—SHEET 3.
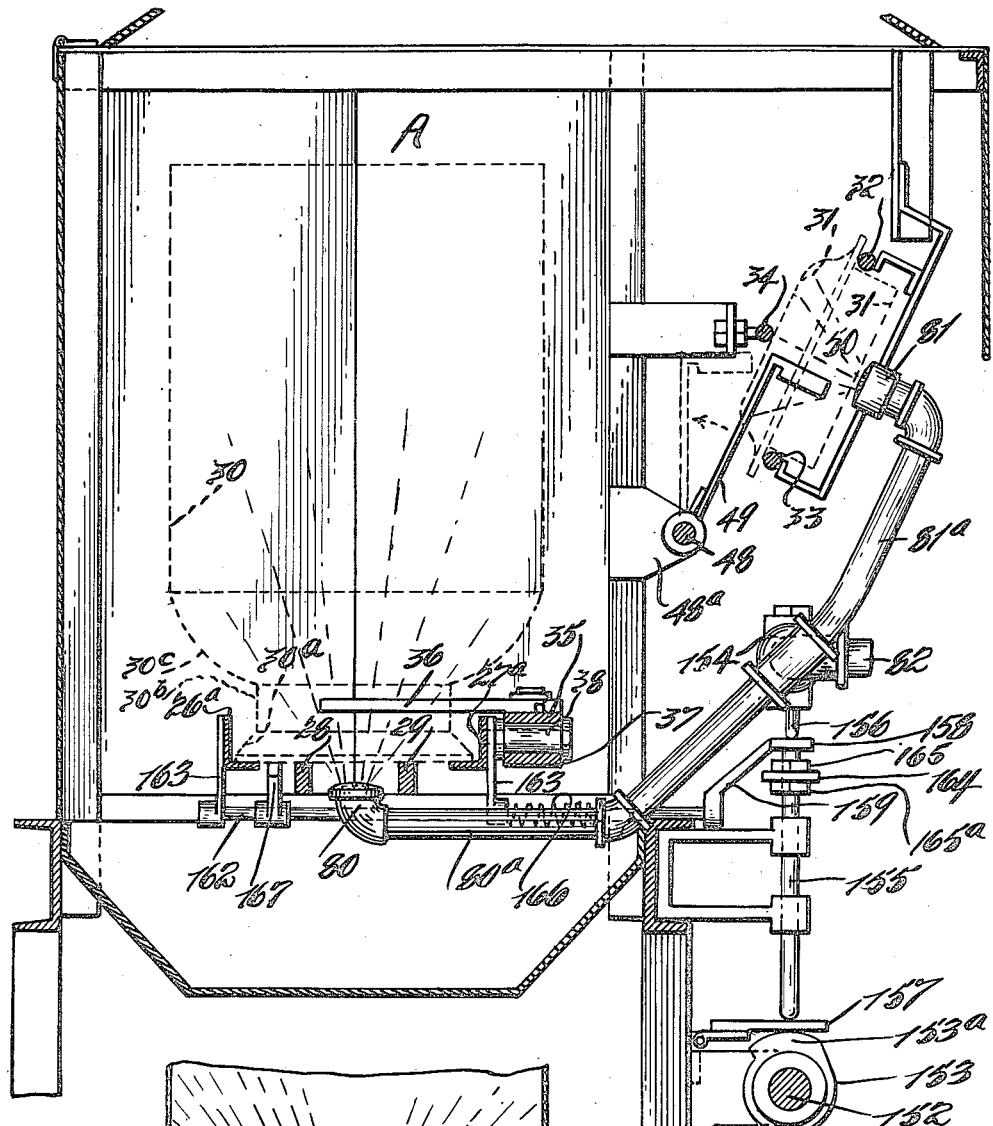
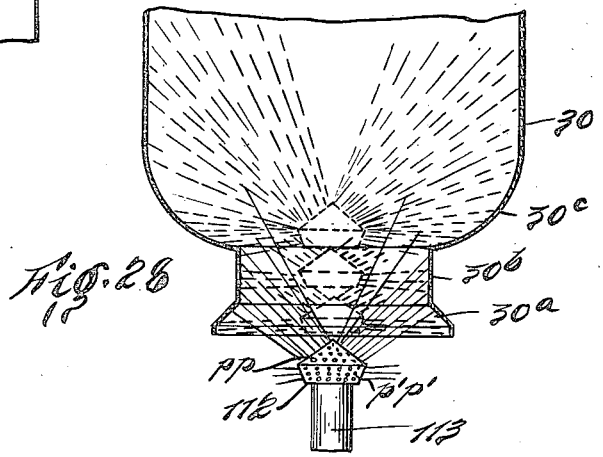
INVENTOR
Burt E. Taylor
BY
Walter D. Edmonds.
ATTORNEY

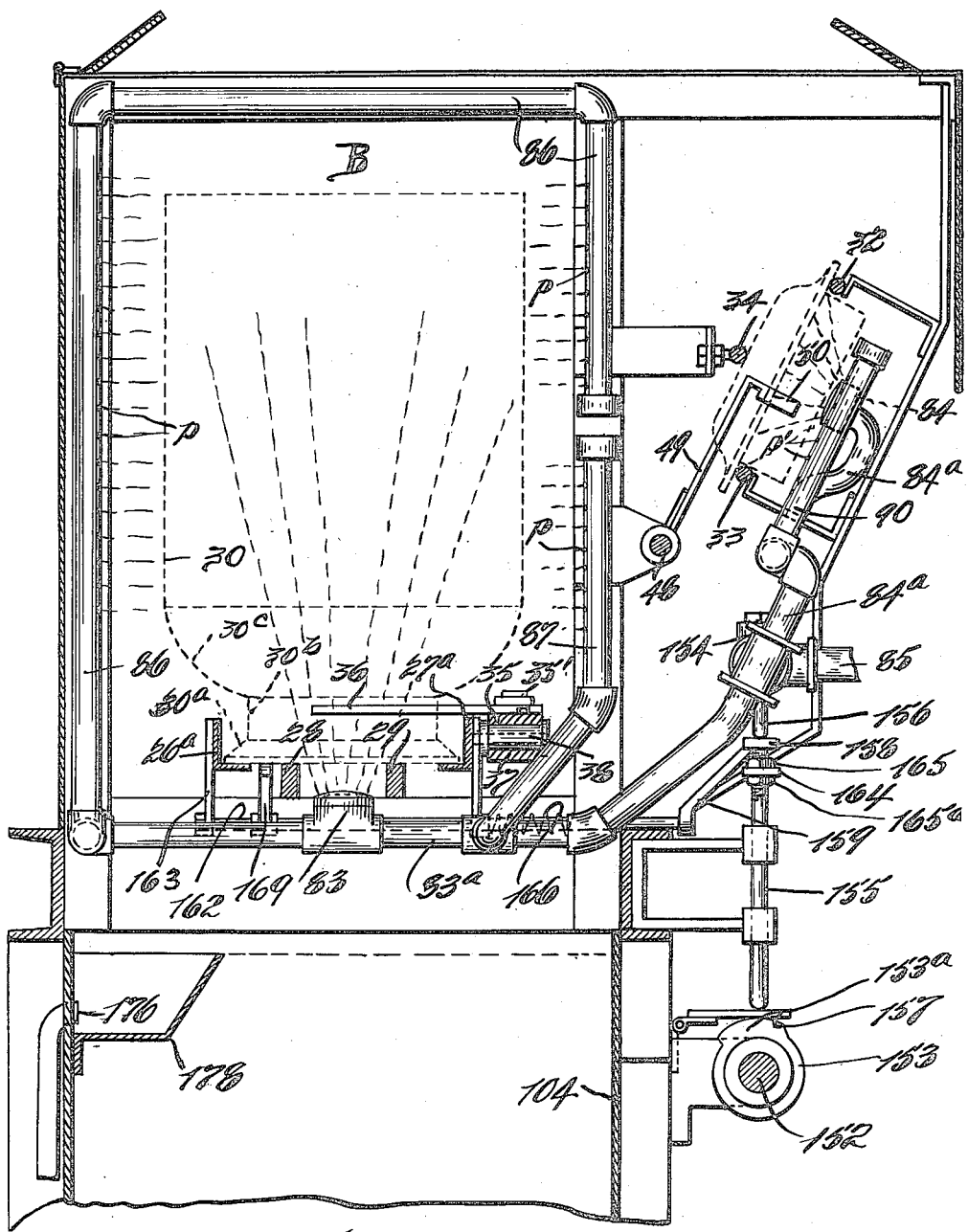

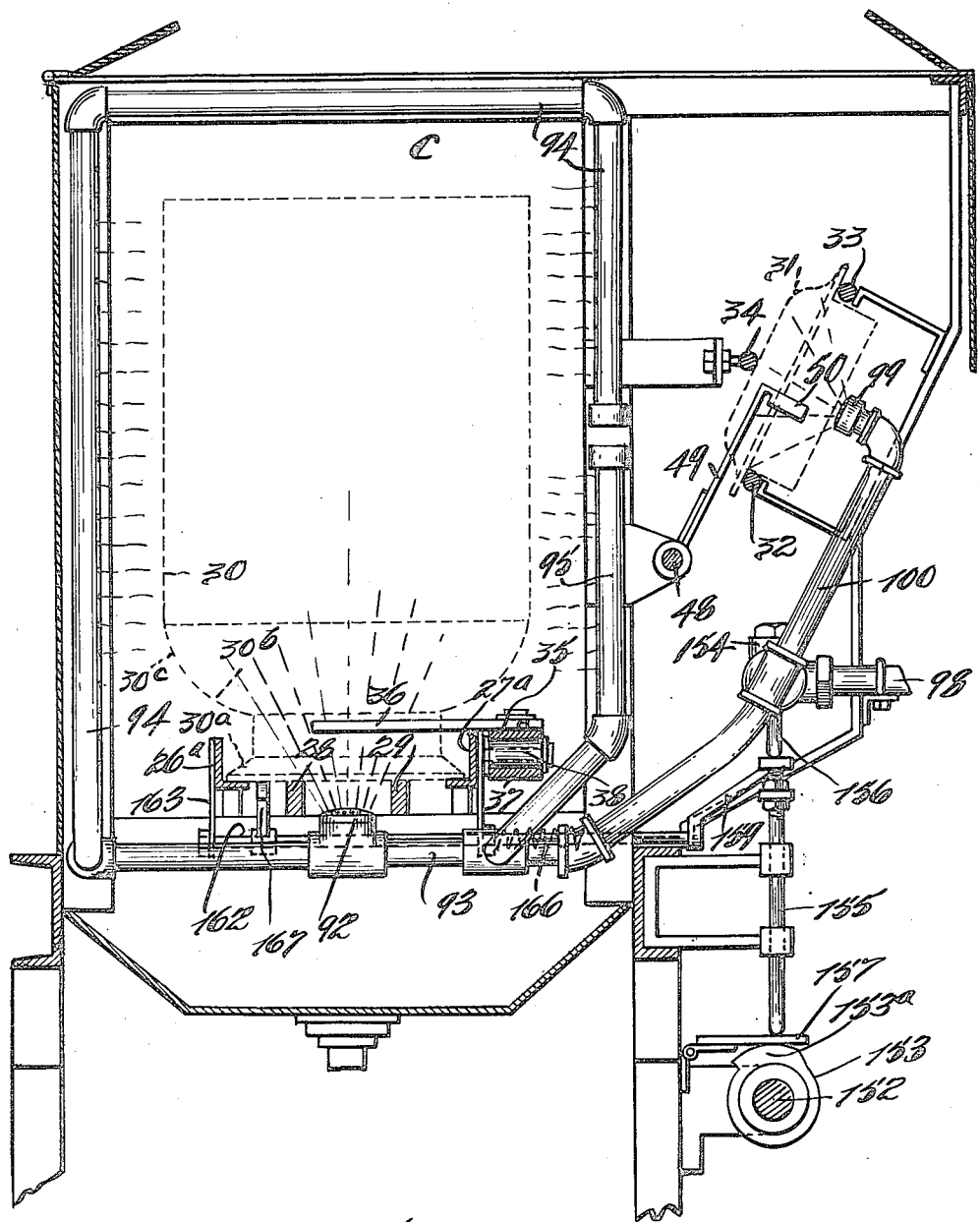

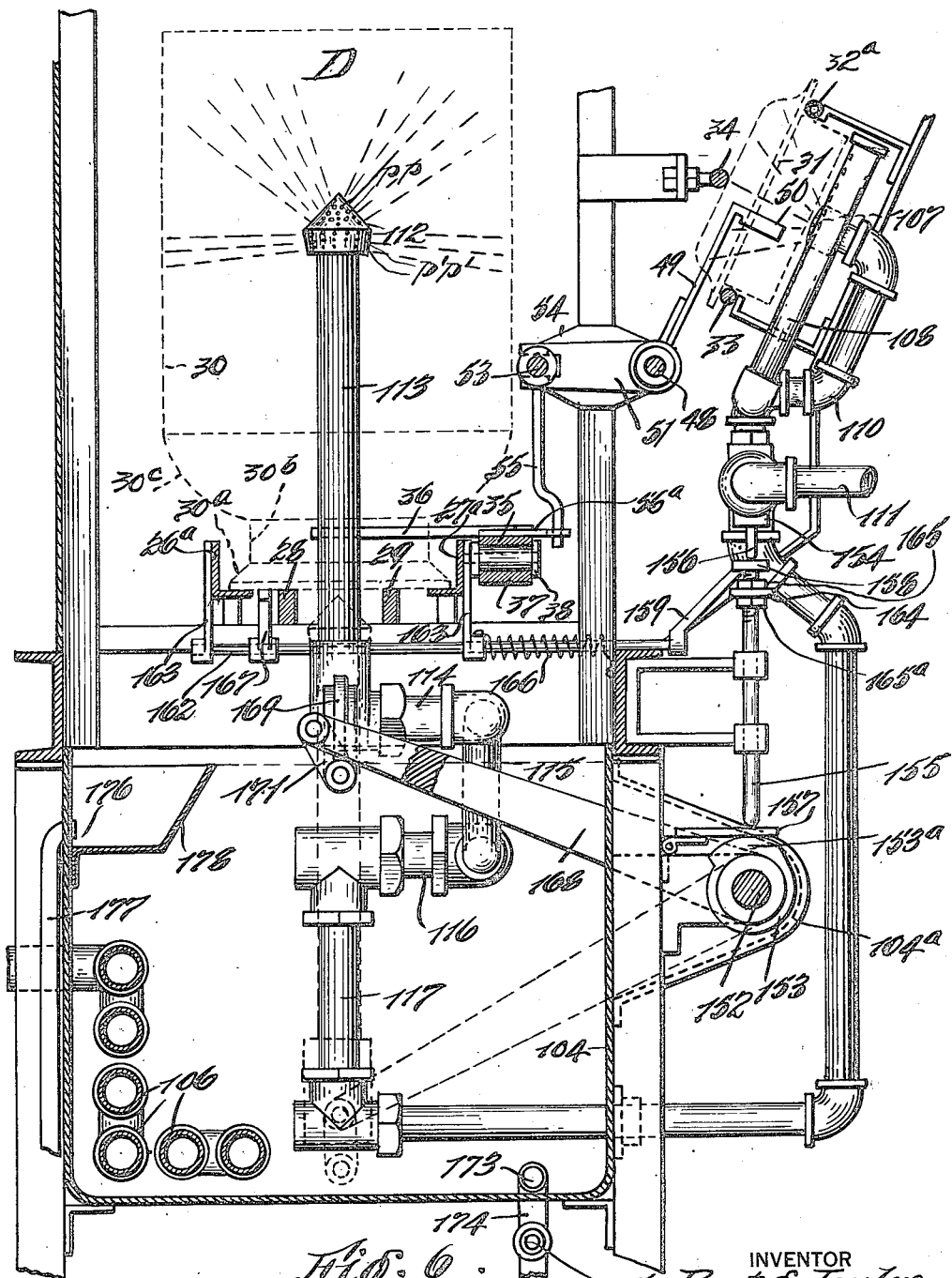

B. E. TAYLOR.
CLEANSING MACHINE OR APPARATUS.
APPLICATION FILED APR. 4, 1918.
1,309,785.
Patented July 15, 1919.
11 SHEETS—SHEET 7.
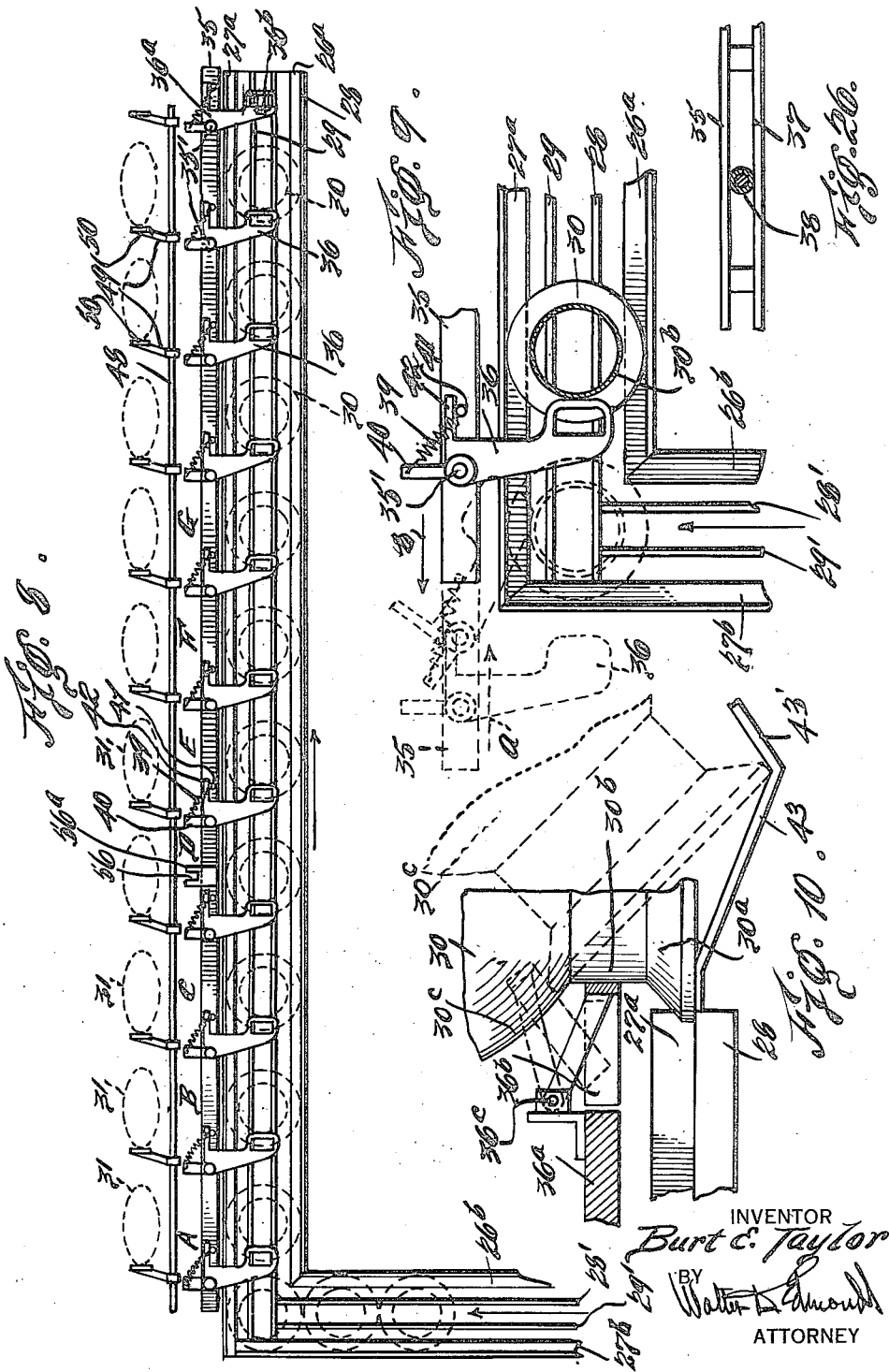
INVENTOR
Burt E. Taylor
BY
Walter L. Edmonds
ATTORNEY B. E. TAYLOR.
CLEANSING MACHINE OR APPARATUS.
APPLICATION FILED APR. 4, 1918.
1,309,785.
Patented July 15, 1919.
11 SHEETS—SHEET 8.
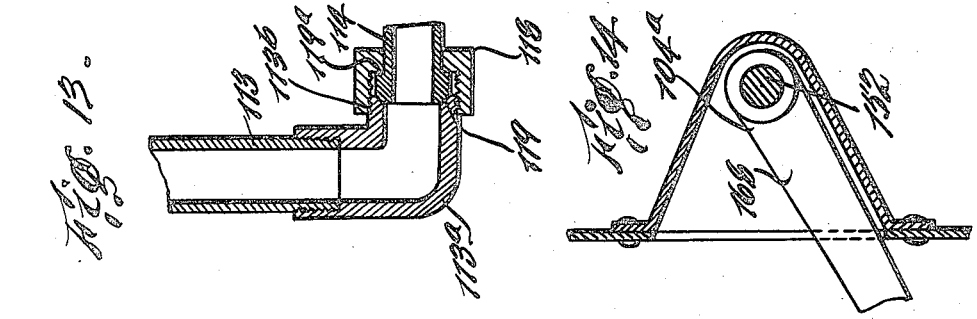
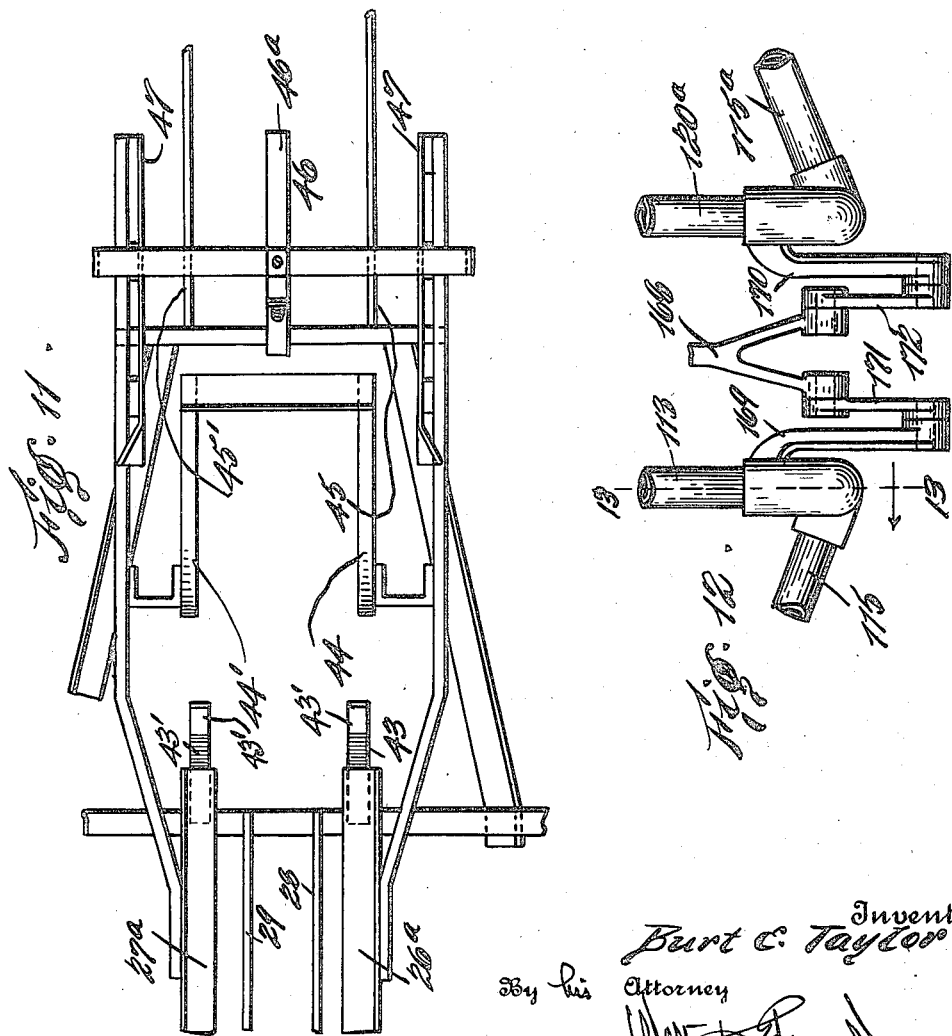

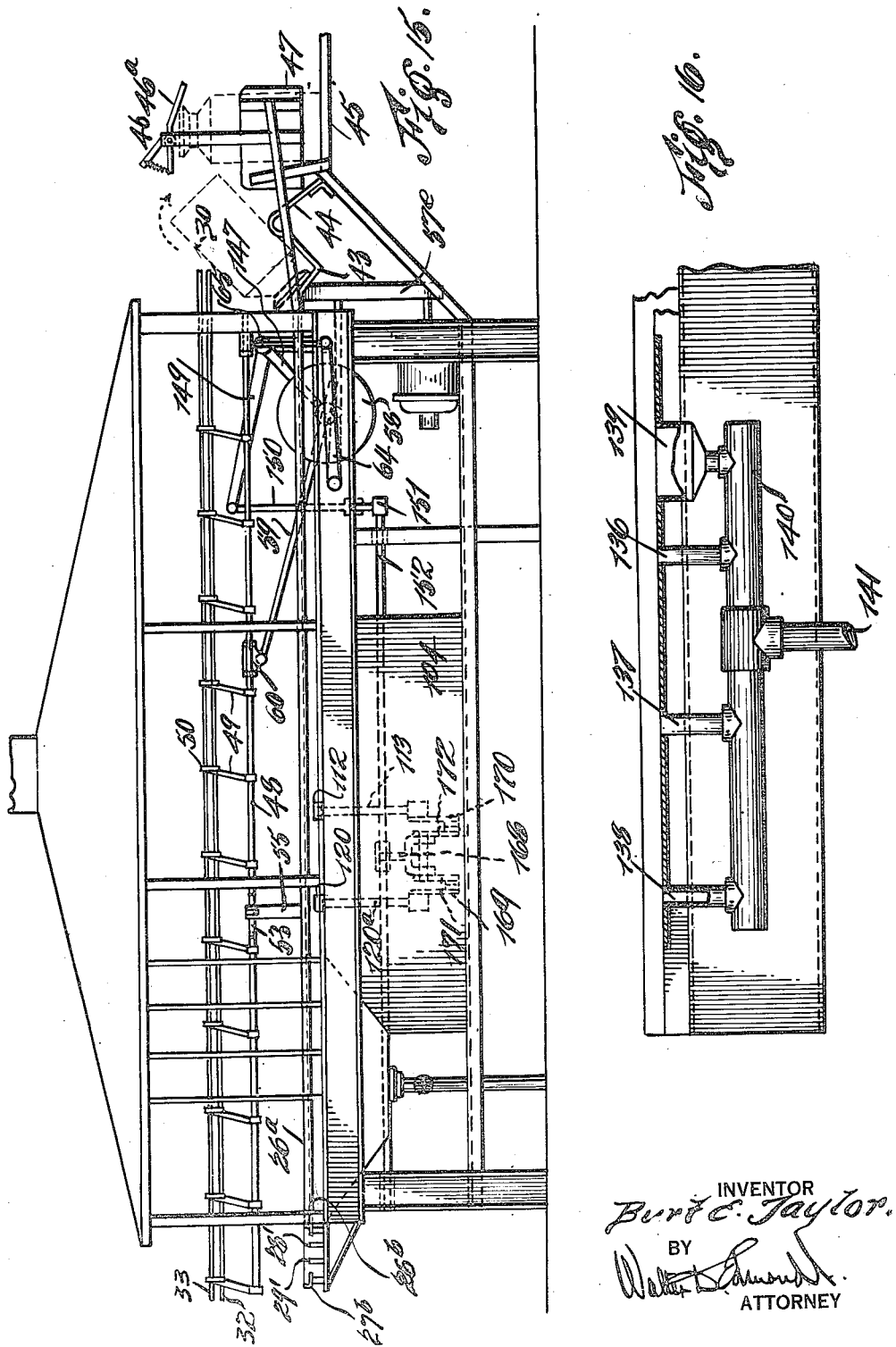

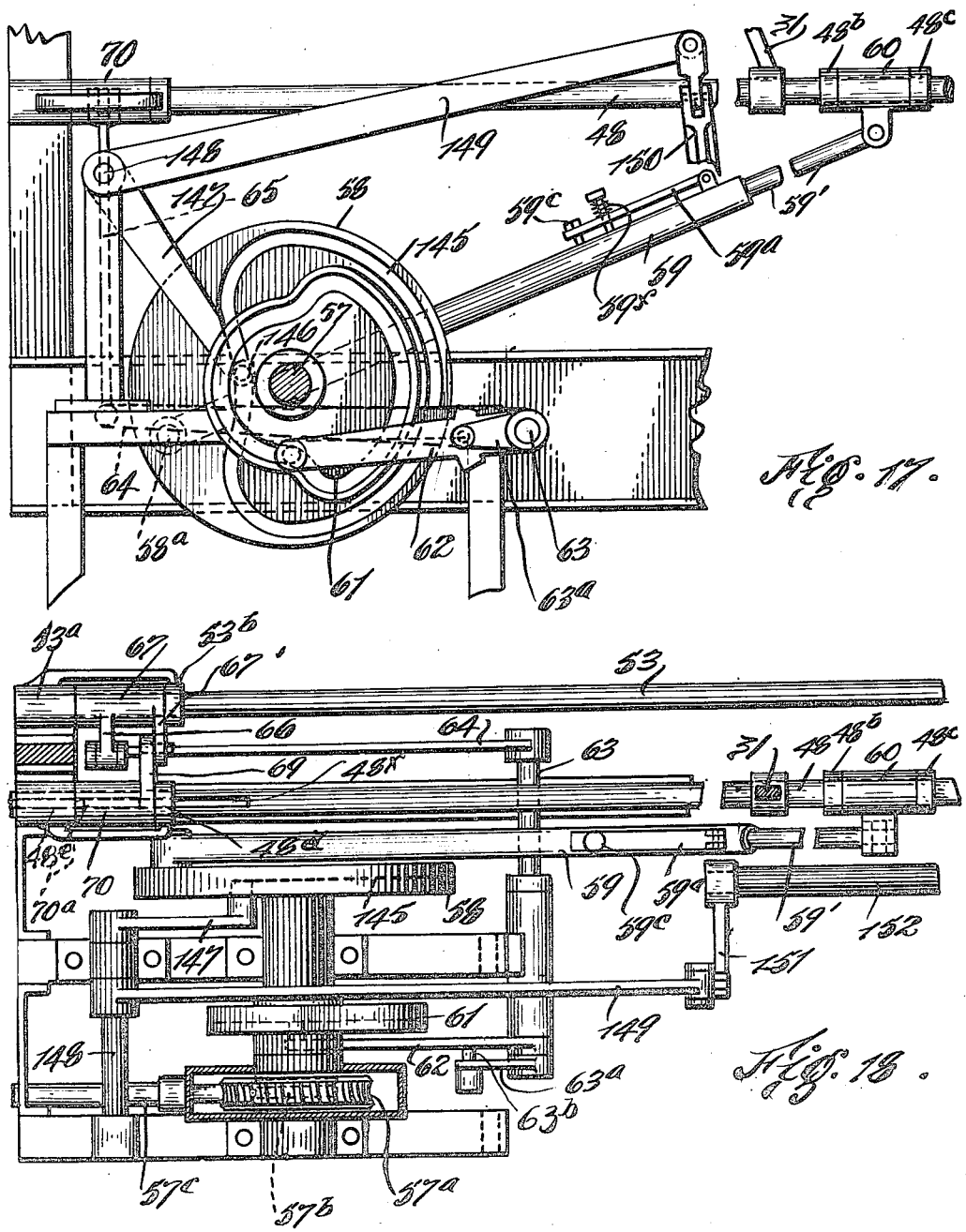

B. E. TAYLOR.
CLEANSING MACHINE OR APPARATUS.
APPLICATION FILED APR. 4, 1918.
1,309,785.
Patented July 15, 1919.
11 SHEETS—SHEET 11.
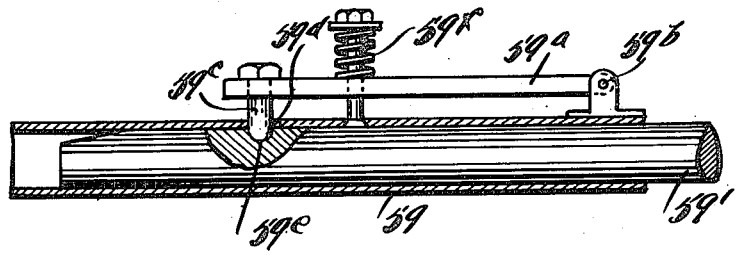
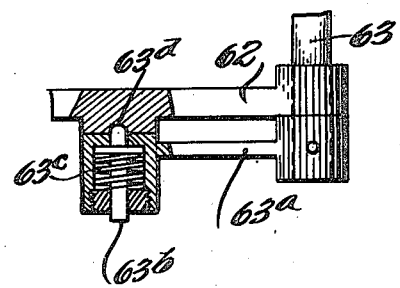
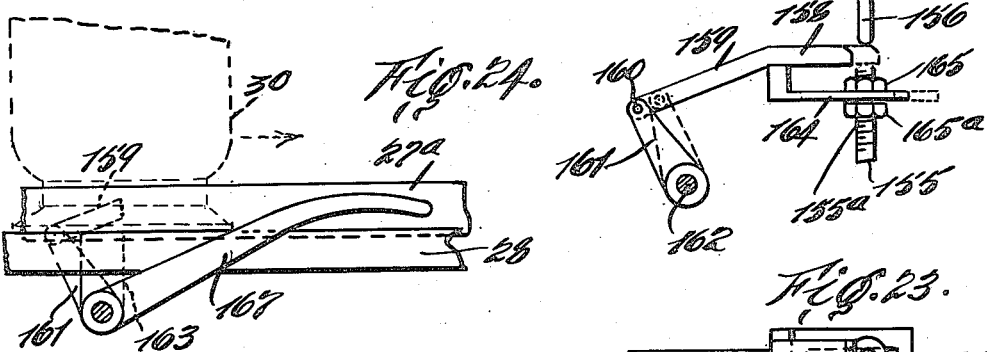
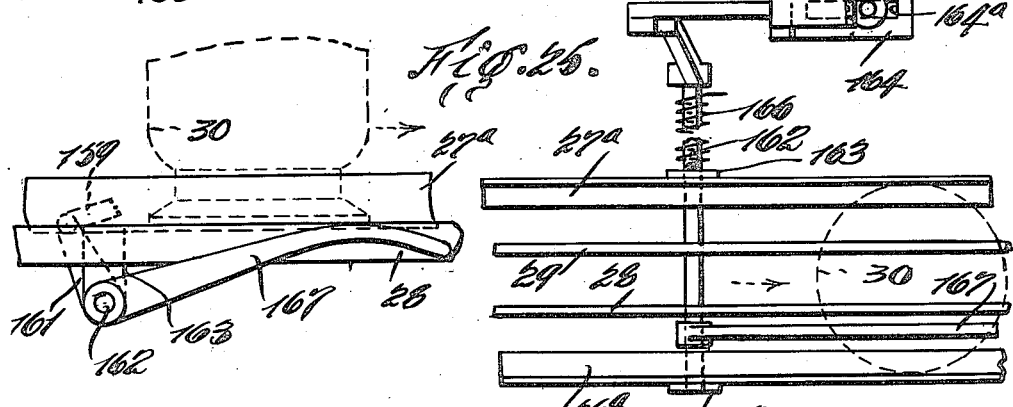
INVENTOR
Burt E. Taylor
BY
ATTORNEY

UNITED STATES PATENT OFFICE.

BURT E. TAYLOR, OF MOUNT VERNON, NEW YORK, ASSIGNOR TO BORDEN'S CONDENSED MILK COMPANY, OF NEW YORK, N. Y., A CORPORATION OF NEW JERSEY.

CLEANSING MACHINE OR APPARATUS.

1,309,785.      Specification of Letters Patent.     Patented July 15, 1919.

Application filed April 4, 1918. Serial No. 226,756.

*To all whom it may concern:*

Be it known that I, BURT E. TAYLOR, a citizen of the United States, and a resident of Mount Vernon, county of Westchester, and State of New York, have invented a new and useful Cleansing Machine or Apparatus, of which the following is a specification.

My present invention relates to apparatus for removing undesired dirt or impurities adhering to various units or articles, particularly those which have been used as containers of substances subject to unwholesome infection or decay. Its objects comprise provision of means, including creation of an organized automatic machine, or apparatus, whereby more automatically than heretofore, and with consequent economy of skill and labor, a more effective and sanitary cleansing is, at diminished cost, and with less wear thereof, impartible to such articles.

The invention is particularly useful for cleansing milk containers, and I have accordingly shown its application to the usual conventional type of "milk can," and its cover, in the accompanying drawings, in which—

Figure 1 is a side elevation of my apparatus viewed from the rear, some parts being omitted.

Fig. 2 is a diagrammatic plan illustrative principally of the arrangement of the fluid-serving devices.

Fig. 3 is, on enlarged scale, a vertical sectional view taken at line 3—3 of Fig. 2, and illustrative of the first treating station, A.

Fig. 4 is a similar view taken at line 4—4 of Fig. 2, illustrative of the second station, B.

Fig. 5 is also a similar view taken at line 5—5 of Fig. 2, and illustrative of the third station, C.

Fig. 6 is also a similar view taken at the line 6—6 in Fig. 2, illustrative of the fourth station D.

Fig. 7 (Sheet 2) is, on enlarged scale, a detached detail view illustrative of one of the devices for cleansing the covers of the cans.

Fig. 8 is a diagrammatic plan illustrative of parts of the can, and cover, forwarding devices.

Fig. 9 is a detail, on enlarged scale, illustrative of the operation of my can forwarding pawls.

Fig. 10 is, on still larger scale, a detail, in part vertical sectional, view illustrative of my finally delivering pawl, and its extension, in action.

Fig. 11 is, on similar scale, a plan of my can-righting devices.

Fig. 12 is, on enlarged scale, a fragmentary detail illustrative of portions of parts of my devices for reciprocating the conduits for the cleansing liquid.

Fig. 13 is an enlarged central sectional view of a detail taken on the line 13—13 of Fig. 12 seen in the direction of the arrow and illustrating features of the construction of my relatively to each other movable conduit connections.

Fig. 14 is a fragmentary section on line 14—14 of Fig. 1 showing the housing of the lever actuating the reciprocation of my fluid supplying conduits.

Fig. 15 is a diagrammatic front elevation of my apparatus, some parts being omitted.

Fig. 16 is an enlarged, partly sectional, detail view of part of the devices for supplying heated air.

Fig. 17 is an enlarged view showing the main power shaft in section and portions of thereby actuated devices and connections in side elevation, these relating to means for forwarding the cans, etc., reciprocating conduits for fluid, operating valves, etc.

Fig. 18 is a plan of Fig. 17.

Fig. 19 (Sheet 2) is, on enlarged scale, a perspective view of details illustrating my devices for connecting my simultaneously reciprocated pawl-carrying rod, and finger-carrying shaft.

Figs. 20 and 21 are enlarged details illustrative of my devices for breaking connection in case of jams.

Fig. 22 is a fragmentary detail illustrative of portions of my devices, whereby is insured non-opening of valves during absence of a can.

Fig. 23 is a fragmentary plan of details of my valve opening and closing mechanism.

Figs. 24 and 25 are diagrammatic views illustrative of my triggers and their operation during the valve control.

Fig. 26 is a fragmentary detail side view illustrating construction of part of the can-propelling devices.

Fig. 27 is a fragmentary perspective view showing the arrangement relatively to each other of the train of nipples and part of the cock therethrough supplied with fluid.

Fig. 28 is a central vertical sectional view of a can, including diagrammatic views, in dotted lines, of the perforated nozzle of the reciprocatable cock at different points of its path and of the directions of the sprays therefrom relatively to the interior of the can.

My apparatus comprises a suitable supporting framework for its components, including a thereby stationarily supported, therethrough extending, preferably horizontal, runway, constituted, in part, by the mutually parallel angle rails 26ª, 27ª, and intermediate bars 28, 29, which make up a support, or track for an in-single-file procession, through the runway, of some of the to-be-cleansed units,—in this instance the cans 30, positioned upside down (Figs. 3–6), the rails being spaced to laterally guide them by sliding contact with their flanges 30ª.

At the charging end of this main runway, another, (Figs. 2, 8, 9), extending at right angles thereto, and on a level therewith (Fig. 15), is constituted by the similar angle rails 26ᵇ, 27ᵇ and bars 27′, 28′. Upon this supplementary runway, an operator, or other instrumentality, having first detached their covers 31 from the cans, positions the latter upside down, as indicated in the drawings, and for a purpose to be described, and pushes them into the main runway, (hereinafter referred to as the runway), after which they are, as will be shown, automatically propelled through the latter. He also, at this stage, positions the detached covers 31, each opposite its respective can, in a runway therefor, comprised by a triplet of mutually parallel longitudinally extended guide and supporting rails 32, 33, 34 (Figs. 3–6, 15), disposed and spaced-apart so as to between them slidingly support and guide a cover through the runway as against thereto transversely exerted pressures, and co-extending to one side of and in proximity to and parallelism with the above described angle rails and bars of the runway for the cans.

The construction is such, as shown by the drawings, that a pair of the guide-rails, i. e. 32 and 33, may be described as being in the same plane, this plane being inclined from the horizontal, while the third guide-rail, 34, is offset to one side of said plane in opposition to the direction of delivery of some of the nozzles, hereinafter described. The guide-rail 34 thus serves to securely, movably, hold the covers against displacement by discharge from the nozzles, and the inclined position imparted to the covers facilitates their progression through the runway, and diminishes the risk of injury to their projecting edges. The disposition of the rails 32, 33 and 34 relatively to each other is also such that the covers are supported and advanced through the runway in inclined positions as indicated in Figs. 3, 4, 5 and 6.

The course of the runway may be said to run through a plurality of zones, or stations, A, B, C, D, E, F, and G, the centers of which are equally spaced apart. At each of these stations I provide means whereby there are there applied to the cans and their covers more or less varied treatments co-operating in sequence to progressively cleanse, and dry, them in unison.

I provide means whereby the cans in their said runway, and simultaneously their respective covers on their railway, are, step by step, therethrough advanced and caused to pause in turn during equal intervals, in register with the center of each of the stations. These means comprise, for the cans, a rod 35 (Figs. 3–6, 8, 9), reciprocatable in parallelism with the runway, and a plurality of pawls 36 vibratably carried by the rod, equally spaced-apart more than the width of a can, and normally projecting into the path thereof in the runway. To the rod 35 is fastened a therefrom-spaced-apart underlying string piece 37 (Figs. 3–6, 26). Supporting rollers 38, carried by the rail 27ª, are positioned in the interspace between the rod and string piece. The pawls are rotatively mounted on pivots 35′, carried by the bar 35. The last in sequence of these pawls 36ª, located nearest the delivery end of the runway, carries, preferably, an extension 36ᵇ therewith vertically-vibratably connected by the pivot 36ᶜ (Fig. 10). A retractile spring 39, connecting the tail piece 40 of each pawl with a stop-pin 41 carried by the rod 35, constantly pulls the shoulder 42 of each pawl up against the pin. This construction holds the pawl rigidly against a can located before it in the runway, and enables it to be deflected by, and to resume normal position before, a can located behind it during reciprocation of the rod 35 (see dotted line Fig. 9,) the arrow $a$ indicating the direction of the advance of the cans and the arrow $b$ the backward movement of the rod. It follows that at each forward stroke of the rod 35 a can, if present, will be pushed by a pawl a step forward in the runway, or thus to register with one of the stations, and that during each retrograde stroke a pawl will be deflected, carried, and positioned to so push another can forward, or to push off of the discharge end of the runway the can which has been thus thereto progressively advanced. It will be noted that in the apparatus illustrated the pawls bear against the contracted neck portions, $30^b$, of the cans. Just beyond the discharge end of the can support of the runway I provide means to automatically reverse the hitherto, as aforesaid, upside-down propelled can to its normal right-side-up position. These means comprise a downwardly inclined stationary member, or extension, of said support, composed of members 43, 43′ (Figs. 10, 11, 15), an abutment composed, in this instance, of members 44, 44′, disposed opposite said incline so as to contact with a thereon downwardly sliding, and ready-to-tip, can below its then center of gravity; means, in this instance rails, 45, 45′, to receive the somersaulted can and means to arrest its momentum, the latter comprising a yielding stop, or brake, 46, comprising a pivotally-supported, downwardly inclined, spring tensioned, shoe $46^a$, disposed to yieldingly engage and press against the top of the still moving can after it alights on the rails, as will readily be understood by reference to Figs. 11 and 15. The construction is such that the extension frame $36^b$, carried by the end pawl $36^a$, suffices to push the upside-down can over the edge of the incline 43, in sliding down which it contacts sharply against the abutment, the location of which is such that the resulting impact tilts, and half turns the can over, landing it right side up on the rails 45, 45′, where it is brought up standing by aid of the brake 46. Lateral guards 47 (Fig. 11) are provided to, if required, further steady the can. The above-described can-righting-and-receiving devices are suitably supported, as may be most convenient, for example, by any suitable system of frames and brackets carried by stationary parts of the main apparatus (see unnumeraled outlines thereof in Figs. 11 and 15).

My means for advancing each can-cover in unison with its respective can comprise a longitudinally reciprocatable and transversely rotatable shaft, 48, carrying a plurality of alike arms 49, terminating in alike fingers 50 (Figs. 1, 3–6, 8, 15). These arms are equally spaced apart the same distance as the pawls 36, and located opposite thereto, and the location of the fingers relatively to the cover guide rails 32, 33, 34, is such that when normally projected into the path of the covers in their runway, the latter are thereby advanced a step and into register with a station at each forward stroke of the shaft. When the shaft is retrograded, it is rotated sufficiently to lift the fingers out of the path (see dotted line Fig. 3), by means hereafter described. The shaft is suitably supported by aid of brackets $48^a$ (Figs. 3–6, etc.) carried by stationary parts of the apparatus.

To impart to the shaft 48 and the rod 35 the required reciprocation in unison I connect them as follows: An arm 51 is loosely mounted on the shaft 48 between collars 52, $52^a$, and its free end is provided with a jaw $51^a$ (Fig. 19), which embraces a rod 53 horizontally-slidably mounted in brackets 54 carried by stationary parts of the apparatus. The rod 53 carries a therefrom depending arm 55, connected therewith by a bifurcated end of said arm, which straddles the jaw $51^a$, the free end of the arm 55 is embraced by a jaw 56, carried by a plate $56^a$, carried by the rod 35 (Figs. 6, 8). A drive shaft 57 carries a crank disk 58 (Figs. 17, 18), having therewith connected one end of a connecting rod, composed of two normally interconnected members 59, 59′, hereafter described, the other end of which rod is pivotally connected with a block 60, carried by the shaft 48 (see also Fig. 15), between thereby carried collars $48^b$, $48^c$ (Fig. 17). The connection is sufficiently loose to permit partial rotation of the shaft 48 within the block 60. The shaft 57 carries a worm gear $57^a$ with which meshes a worm $57^b$, carried by a shaft $57^c$, carrying a pulley $57^d$ (Fig. 1), operated by a belt $57^e$ from a source of power not shown.

The object of the bi-partite construction of the connecting rod above referred to is to guard against injury from jamming of the cans, or other obstruction to operation. The elements 59, 59′, are, as shown, telescoped together and are normally connected for operation by a latch (Fig. 20) consisting of a bar $59^a$, pivoted at $59^b$ to the member 59, and carrying, at its free end, a latch $59^c$, which passes through an opening $59^d$, in the member 59 to engage in a recess $59^e$ in the member 59′. A compressor spring $59^f$ maintains the latch yieldingly in the recess. Any undue resistance to normal operation of the parts will thus operate to sever their operative connection, i. e. will result in displacement of the latch and temporarily enable the two members to move telescopically relatively to each other.

I provide means to partly rotate the shaft 48 around its longitudinal axis, alternately in opposite directions, whereby the fingers 50 are lifted out of the path of the covers in their runway, prior to each retrograde movement of the rod 35, and restored to their normal position in such runway prior to the return or advance movement of the rod. These means comprise a cam 61 (Figs. 17 and 18) carried by the drive shaft 57, acting upon a lever arm 62, which rocks a shaft 63, carrying at its outer end a lever arm 64, connected by a link 65 to an arm 66, carried by a block 67, rotatably mounted upon the rod 53, between collars, or bearing members, 53ª, 53ᵇ, carried by a stationary part of the apparatus. The block 67 also carries an arm 67', which engages an arm 69, carried by a block 70 which it encircles and is, by aid of a thereby carried usual feather, 70ª, co-acting with a slot 48ᶠ, in the shaft 48, keyed to the latter between the collars 48ᵈ, 48ᵉ, carried by a stationary part of the apparatus, the construction being thus such that the shaft 48 and the rod 53 are free to reciprocate longitudinally in unison, and the shaft 48 is partly rotated when required.

I further provide, to guard against injury from jamming of the covers, or other obstructions to operation, a releasable latch connection between the lever 62 and the shaft 63, which comprises, carried by the latter, an arm 63ª (Fig. 21) carrying a latch-pin 63ᵇ, which, by aid of an expansile spring 63ᶜ, yieldingly engages a recess 63ᵈ in the lever 62, which is loosely mounted on the shaft 63. Any undue resistance to normal operation of the parts will thus operate to temporarily sever their mutual operative connection.

I provide each of the stations A, B, C, D, E, F, G, with means for imparting to the cans and covers various fluid treatments, the nature of which respectively, and particularly their interrelated sequence, as hereinafter described, I have discovered to be essential to the most complete, rapid and sanitary cleansing and preparation of the articles for renewed use.

At station A, in alinement with the center thereof, is a stationary spraying-nozzle 80 (Fig. 3) disposed to register with the center of a can thereover pausing in the runway; also a similar nozzle 81 to simultaneously register with the center of a detached cover pausing in its runway. These nozzles are carried by therewith respectively connecting conductors 80ª, 81ª, connecting with a thereto-liquid-supplying pipe 82, provided with a valve 154 (see also Fig. 2) to control the therethrough flow of liquid under pressure, from any convenient source. The disposition of the parts specified, including the nozzles, and the pressure and supply of fluid thereto, are such as to, at this station A, spray the inside of the cover, and, simultaneously, the inside of the neck and the lower interior portions of the upside-down can, the liquid thus here employed being, preferably, cold water, to preliminary rinse.

At station B (Fig. 4) in similar relation thereto I provide similar, similarly disposed, supplied and functioning, nozzles 83 and 84, similarly, respectively, connected with the unitary conductors 83ª and 84ª, connected with a thereto liquid-supplying pipe 85, provided with a valve 154 to control the therethrough flow of liquid under pressure from a convenient source, not shown. At this station B, the conductors 83ª, 84ª, are further connected with extensions. Pipe 83ª is connected with riser branches 86, 87, 88, 89 on both sides of the runway (see Figs. 1 and 2), each having an extended series of perforations or vents $p, p$, (Fig. 4), directed crosswise of the runway these serving to spray the outside of the can with cold water while the inside of the neck thereof and part of the lower interior are again so sprayed,—this time by aid of the upwardly directed nozzle 83. The conductor 84ª is connected with riser branches 90, 91, disposed on each side of the nozzle 84 (Figs. 1 and 4) having an extended series of perforations or vents $p', p'$, directed toward a different side of the runway for the covers 31 by aid of which they are, during their pause at this station, sprayed with cold water on the outside and again on the inside, this time by the nozzle 84 directed toward the center of that runway.

At the station C (Fig. 5) I provide, for the can, a spraying nozzle 92 in combination with a conductor 93, connected with perforated risers 94, 95, 96, 97, etc., (Fig. 2), similarly disposed and functioning as described of similar corresponding elements located at station B, and served by a supply pipe 98, provided with a valve 154. For the covers, at this station, I provide a spray nozzle, 99, disposed and functioning similarly to the before described nozzles 81, 84, and connected with the supply pipe 98 by a conductor 100. At this station the inside of the neck, the lower interior and outside portions of the can, and the inside of the cover are sprayed, but, in this instance, with hot water, supplied as follows: The supply pipe 98 connects with a branched main 101 (Figs. 1 and 2) supplying also stations D, E and F, which, in turn, connects with a pipe 102, into which hot water is forced by a pump, 103, from a tank 104 through a conduit 105 (Figs. 1 and 2). The liquid contents of the tank are heated as required, in this instance by aid of steam passing through an ordinary heating coil 106, submerged in the liquid (Fig. 6).

At station D (Fig. 6) the inside of the covers is sprayed with hot water by aid of a nozzle 107 and the outside by perforated risers 108, 109, disposed and functioning similarly to the corresponding similar elements 84, 90, 91, shown in Fig. 4, and supplied through a conductor, 110, connecting with a conductor, 111, connected through a branch 111$^a$ with the branched main 101 and provided with a valve 154, whereby the supply is controlled. At this station the bottom, and adjacent sides, of the interior of the pausing, upside-down, can are sprayed with hot water by aid of a nozzle, 112, having not only upwardly delivering perforations $p$, $p$ (Figs. 6 and 28), but also laterally and downwardly delivering outlets $p$, $p$, and $p'$, $p'$, respectively (Figs. 6 and 28), carried by the free end of a vertically reciprocatable pipe, 113, connected with the conductor, 111, through a train of rotatably jointed nipples 114, 115, 116, 117 (Figs. 6 and 27). To attain inter-rotatability, without leakage, between the elements 113, 114, 115, 116, 117, 111, I connect the parts by an ordinary union comprising an interiorly threaded collar, 118, as shown in Fig. 13, one of the relatively to the other rotatable elements, in this instance for example 114, being provided with the usual flange 119$^a$; and an elbow extension, 113$^a$, of the other element, 113, being, near its coupling extremity, externally threaded as at 113$^b$, but I grind the mutually contacting surfaces of both of the liquid-conducting elements to a complementary bevel as indicated at 119, which results in a joint which is water-tight, although admitting of rotation between the parts, whenever the interiorly threaded collar 118 is suitably screwed into place, as shown in Fig. 13.

At station E, I provide, for again spraying the interior of the bottom of the can, a nozzle 120 (Fig. 2) similar, in disposition, construction and function, to the nozzle 112 and likewise carried by a vertically reciprocatable pipe indicated by 120$^a$ in Fig. 15, in all respects similar to the pipe 113 and similarly supplied by means of a conductor 121 (Fig. 2) provided with a valve 154 which, through a supply pipe 121$^a$, is also connected with the branched main 101. The pipes 113 and 120$^a$ are simultaneously reciprocated by means to be described. At this station E the insides of the covers are again sprayed with hot water by aid of a nozzle 122 in all respects similar to the nozzle 107, and which, by aid of a conductor 123, is similarly connected and supplied. Meanwhile, at both stations D and E hot water is supplied to the inside surfaces of the flanges of the covers by aid of a tubular section 32$^a$ having perforations $p^3$, $p^3$, of the cover guide rail 32 (Figs. 1, 6, 7) connected by conductor 32$^b$ (Fig. 2) with conductor 111.

At station F, the interior, including the neck, of the there pausing can is finally sprayed with hot water by aid of a nozzle indicated by 124 (Fig. 2), similar in construction and operation to the nozzle 80, or 83, and the cover is simultaneously so sprayed inside by aid of a nozzle indicated by 125 (Fig. 1) and the outside by aid of perforated risers indicated by 126, 127 (Fig. 1), the construction and operation of these devices being the same as those of the corresponding elements 84, 90 and 91 at station B. The nozzle 124 is supplied through conductor 128 (Fig. 2), and the elements 125, 126, 127, through conductor 129, all connecting with branch 130 of the branched main 101 and provided with a valve 154. This completes the rinsing.

At station G, the cans are treated to a dry steam spray by aid of a nozzle indicated by 131 (Fig. 2) and the covers, by aid of a nozzle indicated by 132 (Fig. 1), the construction and the operation of which, as regards service of fluid, are the same as those of the similar elements 80 and 81 at station A, but the steam being delivered thereto respectively through conductors 133, 134 (Fig. 2) and a duct 135, provided with a valve 154 from any convenient source, not shown, all the above mentioned valves, 154, being in this apparatus alike, and each having operatively connected therewith a therefrom projecting valve stem 156, pressure upon which in the direction of the valve serves to open the latter.

At the remaining stations H, I and J, I provide means for drying the cans during their respective pauses thereat, and also, preferably, means in aid of so doing while they are passing from one station to another, in this instance, from station G to station H. These means (see Fig. 16) comprise a series of spouts 136, 137, 138, disposed to deliver upwardly from below the runway and each respectively centered with the stations H, I, J; and, also similarly disposed medially of the runway, between the stations G and H, a spout 139, having an elongated, or slot-shaped mouth extending in parallelism with the runway. The spouts are connected with a reservoir 140, connected by a duct 141 with an air-heating chamber 142 (Figs. 1 and 2) containing a usual coil for passage therethrough of steam. A usual blower 144, driven as usual, forces air into and through the thus heated chamber to blow at suitable temperature out of the spouts upon the cans, thus finally completing their preparation for immediate re-use.

The construction is such that heated air is positively impelled against the cans during their advance from the steam-injecting, to the next, station, and thus provision made to avoid undesirable condensation of steam within the cans during their passage to the first drying station H.

The various fluid treatments imparted to the cans, as above described, are, as regards the stations A to G inclusive, dependent upon the opening of the respective valves, and, at stations D and E, upon the raising of the pipes 113, 120ª into operative position.

For these operations, I provide means as follows: The disk 58 (Figs. 17 and 18) is provided with a cam slot 145, with which coöperates a roller, 146, on a lever arm 147, carried by a shaft, 148, carrying a lever arm 149, the outer end of which is connected with a link 150, the lower end of which link is connected with one end of an arm 151 (Figs. 1, 18), the opposite end of which arm is carried by a rock shaft 152, carrying a plurality of alike cams, 153, one for each of the previously mentioned alike valves 154 (Fig. 1 and see Figs. 3–6). I provide can-controlled means whereby each cam is enabled to coöperate toward opening its therewith associated valve only in case a can has entered, and is suitably positioned in, the particular one of the above described stations with which such cam and valve are associated.

I provide a plurality of alike elements movable toward, i. e. in the line of projection of, the valve stem, 156, the elements being, in this instance, vertically-movably supported push-rods 155 each disposed directly above one of the cams and under the stem 156 (Figs. 6, 22) of its corresponding valve. Between the lower end of each push rod and of the thereunder disposed cam, I interpose a swingable plate 157, one side of which is hinged, as indicated in Fig. 6, to an adjacent stationary part of the machine. The construction is such that whenever, by the rocking of the shaft 152, the high spot 153ª (Fig. 6) of the cam is brought uppermost, it will lift the plate and thus the push rod correspondingly, and when the high spot is deflected the plate and rod will be correspondingly lowered by gravity. The valve remains normally closed and is openable only by aid of pressure applied upwardly to its stem. The valve, including its stem, is always separated from the push-rod by an interspace. In its downmost, or valve-closing, position the bottom of the stem is still separated by a minimum interspace from the top of the push rod even when the latter is in its upmost position. Between each valve stem and push rod, I provide one of a plurality of alike members each proportioned to more than fill the said minimum interspace between the valve stem and the push-rod and each movable transversely into, and out of, the interspace when enlarged by retraction of the push-rod and also, when in the interspace, movable toward the stem, in the line of the latter's projection, these members being, in this instance, blocks 158, the construction being such that when a block is in the interspace so interposed the uplift of the push rod will open the valve. Each of these blocks 158 is carried by a link 159, one end of which is connected by a pivot 160 (Fig. 22) with one end of an arm 161, carried by a rock-shaft 162, extending below and transversely of the can-runway (Fig. 23) and supported in suitable bearings 163 (Fig. 6), suspended from the angle rails 26, 27. The link 159 is guided in its movements by a therewith connected plate 164, having a slot 164ª, through which movably extends the push rod, 155, undue vertical displacement of the plate relatively thereto being prevented by nuts 165, 165ª (Fig. 22) adjustably carried by a threaded portion 155ª of the push rod. Each block 158 is normally held out of the normally existing interspace between the bottom of the valve stem and the top of the push rod by a torsional spring 166, one end of which is secured to the thereby encircled rock shaft 162 and the other end to a stationary part. Each rock-shaft 162 carries also a trigger 167, normally projecting into the pathway of the cans in their runway, and capable of being depressed into a position below the pathway, and there retained, by a thereby encountered and superdisposed can. It follows that whenever a can, during its progression through the runway, so encounters and depresses a trigger at one of the stations, a block, 158, will be interposed in the interspace between the top of the push-rod and the bottom of the valve stem, whereby upward pressure from the push-rod is transmitted through the upwardly yielding block to the valve stem, and the valve opened and kept so but only while the high spot, 153ª, of the cam, 153, is at its uppermost throw, which is timed to occur only while the can is pausing at the station. The construction is, therefore, such that the fluid treatment at each station is controlled by a can thereat and that, in absence of a can at such station, the there disposed fluid treating instrumentalities must remain inactive, though those at any of the other stations may be, at the same time, operating, owing to the thereat presence of a can.

To simultaneously reciprocate the previously described pipes 113 and 120ª, I provide means as follows: The rock-shaft 152 carries an arm 168 (Figs. 6, 12, 14, 15), the outer end of which is forked (Fig. 12). Connected with the pipe 113 is an arm, 169, and with the pipe 120ª a similar arm 170. Links 171, 172 respectively connect the ends of the forked portions of the arm 168 with the arms 169, 170. Owing to the rotatability of the nipples 114, 115, 116, 117, relatively to each other, or therewith connected parts, as at 114ª, 115ª, and 117ª (Fig. 27), the pipe 113 is reciprocatable as stated, and also, simultaneously therewith, the pipe 120ª, the latter being also connected with the fluid supply through a similar train of similarly operating nipples, (not shown).

It will be understood that the timing of the cam 61 relatively to the crank pin 58ª (Fig. 17) carried by the disk 58, is such that while the pin is crossing dead center the shaft 48 will be partly rotated as above described, so as to then cause the arms 49 to assume either their vertical, or their operative horizontal, positions, while the cam slot 145 is timed relatively to said crank pin so as to rock the shaft 148 to open the valves at the stations at the end of the forward stroke of the shaft 48, hold them open during the back stroke, and close them at the beginning of the next forward stroke, the stroke of the shaft being equal to the interspaces between centers of the stations.

The tank, or receptacle for liquid, 104 comprises at one side thereof a water tight, lateral extension, or housing, 104ª (Figs. 6, 14) for the therethrough passing portion of the rock shaft 152, and of the thereby carried arm 168. Inasmuch as the tank receives drainage or drip containing impurities from the cans and covers at stations C, D, E, F and G, and it is desirable that the sprayed fluid be not overcharged with such impurities, most of which, as scum, rise to the surface of the liquid in the tank, I provide the tank with an inlet 173 (Fig. 6) comprising a pipe 174 connecting with a source of liquid supply under pressure (not shown), and comprising a valve 175 whereby the inflow can be regulated as indicated. I also provide the tank with an outlet 176 comprising a conductor 177 leading wherever desired. In the path of the flow of liquid from said inlet toward said outlet I interpose an impervious partition or dam 178, comprising an extended upwardly projecting edge located below the level of the brim of the tank and above the level of the outlet. The construction is such that the liquid flows constantly in a thin sheet over said edge and carries therewith, and thus out of the tank, the floating scum, whereby the latter is skimmed off and the liquid to be sprayed is at all times kept sufficiently clear of greasy, or other floating, impurities.

Operation: An operator, or other agency, detaches its cover from each can, upsets the latter and shoves it, in upside-down position, on the angle rails 26ᵇ, 27ᵇ until it fully enters into the main runway upon the rails 26ª, 27ª. At the same time the detached cover is, by the same agency, placed, opposite its can upon the supporting rails 32, 33, 34. By the retrograde movement of the rod 35, a pawl is deflected, by the can thus positioned, and springs back to normal position as soon as it has passed it; simultaneously the contemporaneous retrograde movement of the shaft 48, in unison with the rod 35, carries one of the then elevated fingers 50 to beyond the cover, after which the partial rotation of the shaft 48 returns the finger to normal position in the runway for the covers. The forward stroke, in unison, of the rod and the shaft will then advance the can and the cover into the first station A. The can acting upon the trigger 167 at that station will, owing to the before described construction, open the there located valve 154 and the can and cover will there be sprayed, as above described, during their pause in advance during the joint retrograde movement of the pawl-carrying rod and the finger carrying rock-shaft. At each advance of the latter the can and its cover will be simultaneously carried another step forward into the next station and there treated as above described. After treatment at the last station the can will be pushed off of the runway and somersaulted into right-side-up-position, as above described. At this point an operator, or other agency, removes the cover from its runway and returns it to its normal position covering the can. This constant association of each can with its respective cover during the operation is of importance, because those elements are often not successfully interchangeable after some use.

An important feature of the construction is that thereby a plurality of cans and their respective covers are being simultaneously and differently treated. The order and the kind of treatment thus successively imparted to the can and its cover, as above described, is also important, particularly when fatty or greasy impurities are to be removed, as from milk cans.

Another very important feature is that a skip in the feed of the cans in no wise affects the operations as regards whatever cans may be in the runway, and that there is no wastage of power or of cleansing materials whenever a can is absent. The forwarding elements continue their operation with comparatively small expenditure of power whatever may be the number of cans in the runway, and there is expenditure of power as regards treating instrumentalities and materials only when a can is present. Thus the apparatus automatically makes allowances for delays or interference in the feed of the cans, and otherwise proceeds with the cleansing operations, unless temporarily stopped by a jam, in which case provision is made for its automatic stoppage without injury, as above described.

Another, and particularly important feature is the gradual vertical reciprocation of the nozzles 112, 120, carried respectively by the pipes 113 and 120ª. These nozzles are provided, as previously described, with not only upwardly, but also with laterally and downwardly delivery perforations, the result of which, assisted by their progressive upward and downward movement within the inverted cans is such that the sprays delivered are enabled to more quickly and perfectly remove all the undesired substances adherent to the interior surfaces of the can and particularly from the curved concavity of the breast thereof than has been heretofore possible by aid of any sprays or other expedients with which I am acquainted.

Fig. 28 indicates this operation, 30ᶜ being the breast and 30ᵇ the neck of the can and dotted lines indicating the nozzle at various stages of its movement and the various directions of the then therefrom radiating sprays from which it follows that some are, as the nozzle rises, projected first upwardly against the downwardly presented edges of adhering particles and thereafter, as the nozzle descends, others are projected downwardly against upwardly presented edges of the particles, this serving to dislodge and remove the latter readily, quickly and completely from these hitherto most difficultly accessible surfaces.

The elongated spout 139, and its above described location so as to copiously deliver heated air to the can immediately after, and while it is passing from, the steam treating station G, is also important since it serves to whisk the steam out of the can before it has opportunity to condense, the drying being thereafter completed by aid of the hot air spouts 136, 137, 138, respectively at the stations H, I and J.

Having now described my invention, what I claim as new and desire to secure by Letters Patent is the following, viz:

1. In a cleansing apparatus, a runway for the passage therethrough of an article; adjacent said runway a conduit for therethrough projection of fluid against said article; means to so project such fluid; a valve normally closing said conduit and having a therefrom projecting stem; means to intermittently force a member toward, without reaching, said stem; a movable block normally out of contact with said member and said stem; and means controlled by the article to interpose said block between said stem and said member, whereby pressure derivable from said member is transmitted through said block against said stem to open said valve.

2. In a cleansing apparatus, a runway comprising a support for the articles to be cleansed; means to advance the articles in the runway; means to discharge fluid toward an article in the runway, said means comprising a normally closed valve; a valve stem operatively connected with and projecting from the valve; an element movable toward, without contacting, the stem; means to intermittently so move said element; a member, interposable between said element and stem, and movable toward the stem; and means controlled by the article to so interpose said member.

3. In a cleansing apparatus, a runway comprising a support for the articles to be cleansed; means to advance the articles in the runway; means to discharge fluid toward an article in the runway, said means comprising a normally closed valve; a reciprocatory stem operatively connected with and downwardly projecting from the valve; an element upwardly movable toward, without contacting, the stem; means to intermittently so move said element; a member interposable between said element and stem, and movable toward the stem; and means controlled by the article to so interpose said member.

4. In a cleansing apparatus, a runway comprising a support for the articles to be cleansed; means to advance the articles in the runway; means to discharge fluid toward an article in the runway, said means comprising a normally closed valve; a valve stem operatively connected with and projecting from the valve; a push-rod movable toward, without contacting, the stem; means to intermittently so move said push-rod; a block, interposable between said push-rod and stem, and movable toward the stem; and means controlled by the article to so interpose said block.

5. In a can-cleansing apparatus, a power shaft; a runway for the cans; means operatively connected with the shaft to intermittently advance the cans in single-file procession and to permit them to pause at predetermined stations in the runway; at a plurality of said stations means to discharge fluid toward a there-pausing can, each of said means comprising a normally closed valve controlled by a therefrom-projecting reciprocatory stem; an element reciprocatable in the direction of projection of and movable toward, without contacting, said stem; means operatively connected with said shaft to intermittently so move said element during said pause; a member interposable between said element and stem, and movable toward the stem; and means controlled by the article to so interpose said member.

6. In a cleansing apparatus, a runway comprising a longitudinally extended track for the articles to be cleansed; means to, in single-file procession, intermittently advance the articles on the track and to permit each article to pause intermittently at one of a plurality of stations; means adjacent each of said stations to intermittently force fluid toward the there pausing article, said last mentioned means comprising, in each instance, a normally closed valve controlled by a therefrom-projecting reciprocatory stem; a reciprocatory push-rod movable toward, without contacting, the stem; a block interposable between said push-rod and stem and movable toward the stem; a plurality of cams, each disposed to coöperate with one of said push-rods; an oscillatory shaft carrying said cams; and means to oscillate the shaft during said pause.

7. In a cleansing apparatus, a runway comprising a longitudinally extended track for the articles to be cleansed; a rotary main shaft; means, operatively connected with said shaft, to, in single-file procession, intermittently advance the articles on the track and to permit each article to pause intermittently at one of a plurality of stations; means adjacent each of said stations to intermittently force fluid toward the there pausing article, said last mentioned means comprising, in each instance, a normally closed valve controlled by a therefrom-projecting reciprocatory stem; also a reciprocatory push-rod movable toward, without contacting, the stem; a block interposable between said push-rod and stem and movable toward the stem; means to so interpose said block; a plurality of cams, each disposed to coöperate with one of said push-rods; an oscillatory shaft carrying said cams; and means, operatively connected with said main shaft, to oscillate the shaft during said pause.

8. In a cleansing apparatus, a runway for the articles to be cleansed; means to advance an article through said runway to, and intermittently permit it to pause at, a predetermined station; adjacent the station fluid discharging means comprising a valve; means to open the valve comprising an oscillatory element movable toward the valve up to a minimum interspace between them; means to so move said element during said pause; a member interposable between the valve and said element and proportioned to more than fill said minimum interspace; and means controlled by the article to so interpose said member while said element is retracted.

9. In a cleansing apparatus a rotatory shaft; a track for the articles to be cleansed; means operatively connected with said shaft to intermittently forward the articles sequentially on said track; means to discharge fluid toward one of said articles while stationary, said means comprising a normally closed valve having a therefrom projecting valve stem; an element movable toward and from said stem without reaching it; means operatively connected with said shaft to intermittently so move said element; a movable member; and means, controlled by the article, to interpose said member between said element and said stem, whereby pressure is transmitted from said element, through said member, to said stem, and its valve thereby opened.

10. In a cleansing apparatus a runway for passage therethrough of a, in-single-file, procession of inverted equally spaced apart containers; means to simultaneously advance said containers and intermittently permit them to pause during an interval at predetermined equally spaced-apart stations in said runway; a plurality of vertically reciprocatable, normally closed, pipes, each normally positioned beneath said runway at one of said stations; means to force fluid through said pipes when open; means to, during said pause, simultaneously raise said pipes into the path of the containers in said runway; means controlled by the container at a station to, during said pause, open the pipe at such station independently of any other pipe; means independent of the container, to close so opened pipes; and means to thereafter simultaneously depress all of the cocks below said pathway.

11. In a can-cleansing apparatus, a runway for the cans; means to therein intermittently advance them upside-down in single-file procession and permit them to pause at predetermined stations; adjacent a station a pipe normally disposed beneath, and reciprocatable into and out of, the runway; means comprising an oscillating shaft for so reciprocating the pipe; means comprising a valve to force fluid through said pipe; means to open the valve comprising a cam carried by said shaft; a member movable, by aid of an advancing can, into coöperative relation with the cam, and the valve; and means to oscillate the shaft during said pause.

12. In a can-cleansing apparatus, a main power shaft; a runway for the cans; means, operatively connected with said shaft, to therein intermittently advance them upside-down in single-file procession and permit them to pause at predetermined stations; adjacent a station a pipe normally disposed beneath, and reciprocatable into and out of, the runway; means comprising an oscillating shaft for so reciprocating the pipe; means comprising a valve to force fluid through said pipe; means to open the valve comprising a cam carried by said oscillatory shaft; a member movable, by aid of an advancing can, into coöperative relation with the cam, and the valve; and means, operatively connected with said main shaft, to actuate the oscillatory shaft during said pause.

13. In an apparatus for cleansing milk cans, a rotatory shaft; a continuous substantially horizontal runway for the cans; means to therethrough advance, step by step, with intervening pauses, a single-file procession of inverted cans; a vertically reciprocatable pipe normally disposed beneath the runway to register with a can during one of its pauses; means operatively connected with said shaft to, during each of said pauses, reciprocate said pipe into and out of the runway, a normally closed valve to regulate discharge of fluid from said pipe; means to force fluid through said cock during opening of said valve; and means to open said valve, comprising a movable member controlled by the can, and an element operatively connected with, and by aid of, said shaft intermittently moved toward said member and valve.

14. In a can cleansing apparatus, a rotatory shaft; a track for the cans; means operatively connected with the shaft to, step by step, with intervening pauses, forward the cans inverted on the track; a vertically reciprocatable pipe normally disposed beneath the track in register with a can during a pause; means operatively connected with the shaft to, during each pause, reciprocate the pipe to, and from, above the track; means to discharge fluid through the pipe; a normally closed valve controlling such discharge and having a projecting reciprocatable stem; a reciprocating element operatively connected with the shaft and by aid thereof intermittently moved toward the stem to an interspace therefrom; a movable block dimensioned to more than fill the interspace; and means controlled by a can to interpose the block in the path of said element.

15. In a cleansing apparatus, a runway for the articles to be cleansed, comprising three of mutually parallel, longitudinally extended, guide-rails, disposed and spaced apart so as to between them slidingly support and guide an article through the runway as against thereto transversely exerted pressures one of said guide rails comprising a tubular section thereof having perforations; means to force fluid against the article through said tubular section and perforations; and means to meanwhile advance the article through the runway.

16. In a cleansing apparatus, a runway for the articles to be cleansed, comprising three mutually parallel, longitudinally extended, guide-rails, disposed and spaced apart so as to between them slidingly support and guide an article through the runway as against thereto transversely exerted pressures one of said guide-rails comprising a tubular section thereof having perforations; means to force fluid against the article through said section and perforations; and means to meanwhile advance the article through the runway.

17. In a cleansing apparatus, a runway for the articles to be cleansed, comprising a longitudinally extended guide-rail for an article, the said rail comprising a tubular section thereof having perforations; means to force fluid against the article through said section and perforations; and means to meanwhile advance the article through the runway.

18. In an apparatus for cleansing articles, a runway for the articles comprising three longitudinally extended mutually parallel rails, disposed to between them mutually contact, support and guide the articles while therethrough advancing in inclined position; a nozzle disposed to one side of said rails and directed between two of said rails toward the third rail; means to advance an article, inclined as aforesaid, through the runway and to permit it to pause opposite the nozzle and means to, during the pause, discharge fluid through the nozzle toward the article and said third rail.

19. In a cleansing apparatus, a runway for the articles to be cleansed, comprising a pair of mutually parallel longitudinally extended guide-rails, disposed in a plane inclined from the horizontal; a third guide-rail extended in parallelism with said rails and offset from the upwardly presented side of said plane, the three rails being spaced apart so as to between them slidingly support and guide an article through the runway as against thereto transversely exerted pressures; a nozzle offset from the downwardly presented side of said plane and directed toward said third rail; means to force fluid through said nozzle; and means to advance the article through said runway between said rails and to permit it to pause when opposite said nozzle.

20. In a can and cover cleansing apparatus, a runway comprising a track for the cans; another runway comprising guide-rails for the covers disposed to one side of, above, said track; a fluid-conductor having beneath the track an upwardly directed nozzle, and above the track branches, or extensions, on both sides of the runway, each branch containing an extended series of perforations, or vents, directed crosswise of the runway; a fluid-conductor unitary with said first mentioned conductor and having a nozzle directed toward the center of the runway for the covers, and branches disposed on each side of said last mentioned nozzle, and each having an extended series of perforations, or vents, directed toward different sides of said runway for the covers; a fluid-supplying pipe connecting with said conductors; a valve in said pipe; means to simultaneously advance a can upside-down and a cover in their respective runways and to permit them to simultaneously pause when respectively opposite one of said nozzles; means to force fluid simultaneously through said nozzles and said vents when the valve is open; and means, operative by aid of the can, to, during said pause, open the valve.

21. In an apparatus for cleansing articles, means for intermittently discharging fluid against an article, said means comprising a valve controlling the discharge and having a therefrom downwardly projecting reciprocatory stem; a reciprocatory push-rod upwardly movable toward, without contacting, the stem; a block interposable between said push rod and stem; means actuated by the article to so interpose the block; an oscillatory shaft; a cam carried by the shaft and coöperating with the push-rod; and a swingable plate interposed between, and contacted by, the cam and the push-rod and hinged to an adjacent stationary part of the apparatus.

BURT E. TAYLOR.

Witnesses:
WILLIAM J. HOPKINS,
ELSIE C. KEINER.